(12) United States Patent
Fraser

(10) Patent No.: US 11,597,613 B2
(45) Date of Patent: Mar. 7, 2023

(54) TRANSPORT AND HOISTING OF SLURRY

(71) Applicant: HYDRO POWER EQUIPMENT (PTY) LTD, Johannesburg (ZA)

(72) Inventor: Peter Duncan Fraser, Centurion (ZA)

(73) Assignee: HYDRO POWER EQUIPMENT (PTY) LTD., Johannesburg (ZA)

( * ) Notice: Subject to any disclaimer, the term of this patent is extended or adjusted under 35 U.S.C. 154(b) by 0 days.

(21) Appl. No.: 17/272,593

(22) PCT Filed: Sep. 2, 2019

(86) PCT No.: PCT/IB2019/057392
§ 371 (c)(1),
(2) Date: Mar. 1, 2021

(87) PCT Pub. No.: WO2020/044322
PCT Pub. Date: Mar. 5, 2020

(65) Prior Publication Data
US 2021/0371216 A1    Dec. 2, 2021

(30) Foreign Application Priority Data

Aug. 31, 2018 (ZA) .................................. 2018/05859

(51) Int. Cl.
*B65G 53/30* (2006.01)
*E21F 13/04* (2006.01)

(52) U.S. Cl.
CPC ............ *B65G 53/30* (2013.01); *E21F 13/042* (2013.01)

(58) Field of Classification Search
CPC ............................... B65G 53/30; E21F 13/042
USPC ............ 406/48, 50, 109, 144, 197, 124, 126
See application file for complete search history.

(56) References Cited

U.S. PATENT DOCUMENTS

| | | | |
|---|---|---|---|
| 1,576,617 A * | 3/1926 | Prince | B65G 53/30 406/132 |
| 3,690,729 A * | 9/1972 | Facchini | B65G 53/30 417/139 |
| 4,154,484 A | 5/1979 | Holzenberger | |
| 9,133,701 B2 * | 9/2015 | Luharuka | E21B 43/267 |

FOREIGN PATENT DOCUMENTS

WO    WO-2021124262 A1 *   6/2021

* cited by examiner

*Primary Examiner* — William R Harp
(74) *Attorney, Agent, or Firm* — Muncy, Geissler, Olds & Lowe, P.C.

(57) ABSTRACT

A feeder arrangement for a slurry transport system, which is preferably a hydro hoist, includes a chamber with a high pressure water inlet, a low pressure water outlet, and a low pressure solids inlet at a top end. The low pressure solids inlet has a transfer chute that opens into a lower section of the chamber to maintain a clear-water environment adjacent the top end. A high pressure solids and water outlet is provided at a bottom end. The inlets and outlets are controlled by suitable valves. Three such chambers are preferably operated together in sequence between incoming and outgoing columns in a mine.

20 Claims, 5 Drawing Sheets

TRANSPORT AND HOISTING OF SLURRY

FIELD OF THE INVENTION

The invention relates to equipment for, a system for, and a method of introducing ore, crushed rock, run-of-mine and/or other particulate material ("solids") into a delivery conduit for transport as a slurry and particularly for hoisting in a column.

More specifically the invention will be implemented in the depths of a mine and employ a U-tube configuration with water travelling down a supply column into lower levels (usually of an underground mine) where the "solids" are collected and up another, delivery column.

BACKGROUND TO THE INVENTION

This application claims priority from South African provisional patent application number 2018/05859 filed on 31 Aug. 2018, the disclosure of which is incorporated into this specification by reference thereto.

The use of 3 Chamber Pump Systems (3CPS) or Feeder Systems (3CPFS) for transport and hoisting of slurry is known. A 3CPS may be fed underground by a slurry fluidiser. There are various mechanisms proposed for the fluidisation of rock, which must be crushed to a suitable size. The fluidisation serves to achieve the slurry as required and this must then be introduced between water of the incoming and outgoing columns. There are practical problems that need to be overcome by slurry forming or fluidising equipment and the introduction of the slurry into the pressure transfer system. The "fluidiser" is required to provide slurry at a nominal concentration. There are difficulties in maintaining homogenous mixtures with large particles and it can be expected that a given degree of concentration excursions will occur. Another issue is that valves need to be closed in the presence of solids and/or fines.

The development of hydraulic ore hoisting technology that effectively achieves a desired hoisting result, particularly from depths of around or over 1000 m, can present huge savings for mining operations and mine development.

OBJECT OF THE INVENTION

It is an object of the current invention to provide equipment, a system and/or a method that involves an improved arrangement of components and new principles of operation for the introduction of solids between high pressure water supply and a slurry delivery line and/or the reduced wear and improved sealing efficiency of the valves that are employed.

SUMMARY OF THE INVENTION

In accordance with a first aspect of the invention there is provided feeder arrangement for a slurry transport system comprising at least one chamber with a top end and a bottom end, the chamber including:
a. a high pressure water inlet adjacent the top end controlled by a first valve;
b. a low pressure solids inlet controlled by a second valve and having a transfer chute that opens at a position spaced apart from the top end;
c. a low pressure water outlet adjacent the top end controlled by a third valve for displaced water when the solids inlet is opened; and
d. the bottom end of the chamber having a high pressure solids and water outlet controlled by a fourth valve and connected to a slurry delivery conduit.

The invention further provides for a feeder arrangement as defined, in which:
the transfer chute opens at a position suitably spaced apart from the top end of the chamber to maintain a substantially clear-water environment at or adjacent the top end of the chamber;
the transfer chute opens into a lower section of the chamber;
the solids inlet is provided adjacent the top end of the chamber;
the solids inlet enters through the top end of the chamber with the transfer chute extending from the top end [centrally] within the chamber;
a space between the transfer chute and a chamber bottom is sufficient for a batch of solids to pile with a clearance remaining below the transfer chute;
the solids inlet is gravity fed with the second valve located in an outlet from a batching flask; and
a water by-pass duct extends from a first location above an opening of the transfer chute to a second location adjacent the bottom end of the chamber.

Further features of the invention provide for the chamber bottom to be inclined towards the high pressure solids and water outlet and for the by-pass duct to channel clear-water to fluidise and dilute solids exiting the chamber.

The flow at an outlet of the by-pass duct serves to dislodge and mobilise solids inside the pile adjacent the high pressure solids and water outlet.

The invention further provides for a feeder arrangement as defined, in which:
the by-pass duct is at least one pipe that extends within the chamber; and
the by-pass duct depends from the transfer chute, with an inlet to the by-pass duct spaced upwardly from an outlet from the transfer chute.

Further features of the invention provide for a flow-resistance device to be provided above the lower section of the chamber; for there to be two or more flow resistance devices at spaced apart positions along the chamber; and for the flow-resistance devices to be provided as orifice (or perforated) plates, alternatively, as a stack of parallel tubes or of any other suitable construction that prevents mixing or deters migration of fines from the lower section to the upper section.

The invention further provides for a feeder arrangement as defined, in which the low pressure water outlet is connected to a constant-head arrangement with a water level that keeps the second valve submerged.

A further feature of the invention provides for the constant-head arrangement to a constant-head tank with an over-flow weir positioned above the second valve.

The invention further provides for a feeder arrangement as defined, in which: a primary connection is provided into the top end of the chamber, above which the second valve is located and through which the transfer chute extends into the chamber, a secondary connection is provided that extends into a side of the primary connection, with the high pressure water inlet and the low pressure water outlet connected to the secondary connection for communication with the chamber through the primary connection, around the transfer chute.

The invention accordingly provides for the high pressure water inlet and the low pressure water outlet to be in communication with the chamber through the primary connection around the transfer chute.

The invention further provides for a feeder arrangement as defined, in which:
- the low pressure water outlet is connected to feed at least one injection pump located in a high pressure return line that re-introduces the water to the slurry transport system;
- the injection pump is connected into the delivery conduit; and
- the injection pump is connected into a clear-water supply conduit to the high pressure inlet.

A further feature of the invention provides for the constant-head tank to be connected through a second lower tank and return pump to a third upper tank which feeds the least one injection pump.

The invention provides for the re-injection of displaced water into the slurry transport system to achieve dilution and favourable solids/rock densities. Where the re-injected water goes back into clear-water supply conduit, it contributes to clearing the chamber as well as dilution of the solids.

The invention further provides for a feeder arrangement as defined which includes two or more chambers that are vertically supported and arranged parallel in an adjacent configuration, each with a high pressure solids and water outlet feeding separately into a manifold that is connected to the delivery conduit.

The invention further provides for a feeder arrangement as defined, in which:
- a long radius outlet bend is provided between the high pressure solids and water outlet of each chamber and the manifold;
- a rotary distributor rotates to fill a batching flask located above each chamber; and
- each flask includes a spill way that feeds an associated collection tank.

A further feature of the invention provides for the return line of the at least one injection pump to be connected into the manifold.

The invention further provides for a feeder arrangement as defined, in which:
- the slurry transport system is a hydro hoist with a clear-water supply conduit provided by an incoming column connected to a booster pump and the slurry delivery conduit provided by an outgoing column; and
- the hydro hoist includes one or more spare columns and an outlet pipe from the manifold and/or the clear-water supply conduit to the feeder arrangement are interchangeably connectable between at least two columns.

A further feature of the invention provides for a delivery conduit flush valve to be provided in a branch that connects the supply conduit to the return line downstream from the at least one injection pump to by-pass the feeder arrangement.

In accordance with a second aspect of the invention there is provides a method of feeding solids into slurry transport system comprising:
a. introducing solids into a water-filled chamber
 i. at a position suitably spaced apart from a top of the chamber;
 ii. maintaining a clear-water region adjacent the top of the chamber;
b. while allowing water displaced by the solids to move out of the chamber through a low pressure outlet adjacent the top of the chamber; and
c. opening a high pressure inlet adjacent the top of the chamber and a high pressure outlet from a bottom of the chamber to evacuate the solids from the chamber;
d. directing the solids into a slurry delivery conduit; and
e. closing the high pressure outlet at a stage when there is clear-water exiting the chamber.

The invention further provides for a method as defined, in which:
- the solids are fed into the chamber under force of gravity;
- a batch of solids is introduced into the chamber in first part of a low pressure chamber filling cycle time and for the remainder of the chamber filling cycle time to be used for the solids and accompanying fines in the batch to settle and migrate downwardly under gravity;
- the remainder of the chamber filling cycle time is also used for flushing of a solids batching flask and a solids inlet valve;
- the solids are delivered into a lower section of the chamber through a transfer chute;
- a bottom by-pass duct is used to provide a low resistance passage for water from above a pile of settled solids to a position within the pile and adjacent the bottom of the chamber; and
- the low pressure water outlet is connected to a constant-head arrangement with a level provided to keep a solids inlet valve in a low pressure solids inlet submerged.

Further features of the invention provide for the solids to be directed from the solids inlet valve to the lower section of the chamber directly via the transfer chute and using a gravity head (fall height) from the solids filling flask; for the solids to be concentrated at the bottom of the chamber (i.e. not uniformly mixing them throughout the chamber) via the transfer chute and for a clear-water environment to be maintained in an upper section of the chamber; and for the bottom by-pass duct to be used to connect an upper section of the chamber to a lower section of the chamber (which is filled with solids) for the solids to be fluidised and diluted on exiting of the chamber.

Further features of the invention provide for water displaced by the solids to be reintroduced into the slurry transport system using at least one high pressure injection pump; for the high pressure injection pump to be connected into a slurry delivery conduit and/or a clear-water supply conduit to the high pressure inlet.

The invention provides for a first valve to be opened for inlet of high pressure water, a second valve to be opened for inlet of solids, a third valve to be opened for outlet of low pressure water displaced by the solids, and a fourth valve at a bottom of the chamber to be opened for outlet of high pressure water and solids.

BRIEF DESCRIPTION OF THE DRAWINGS

These and other features will become more apparent from the following description of an embodiment of the invention made by way of example with reference to the following drawings which show in.

DETAILED DESCRIPTION OF THE INVENTION

Figure 1:
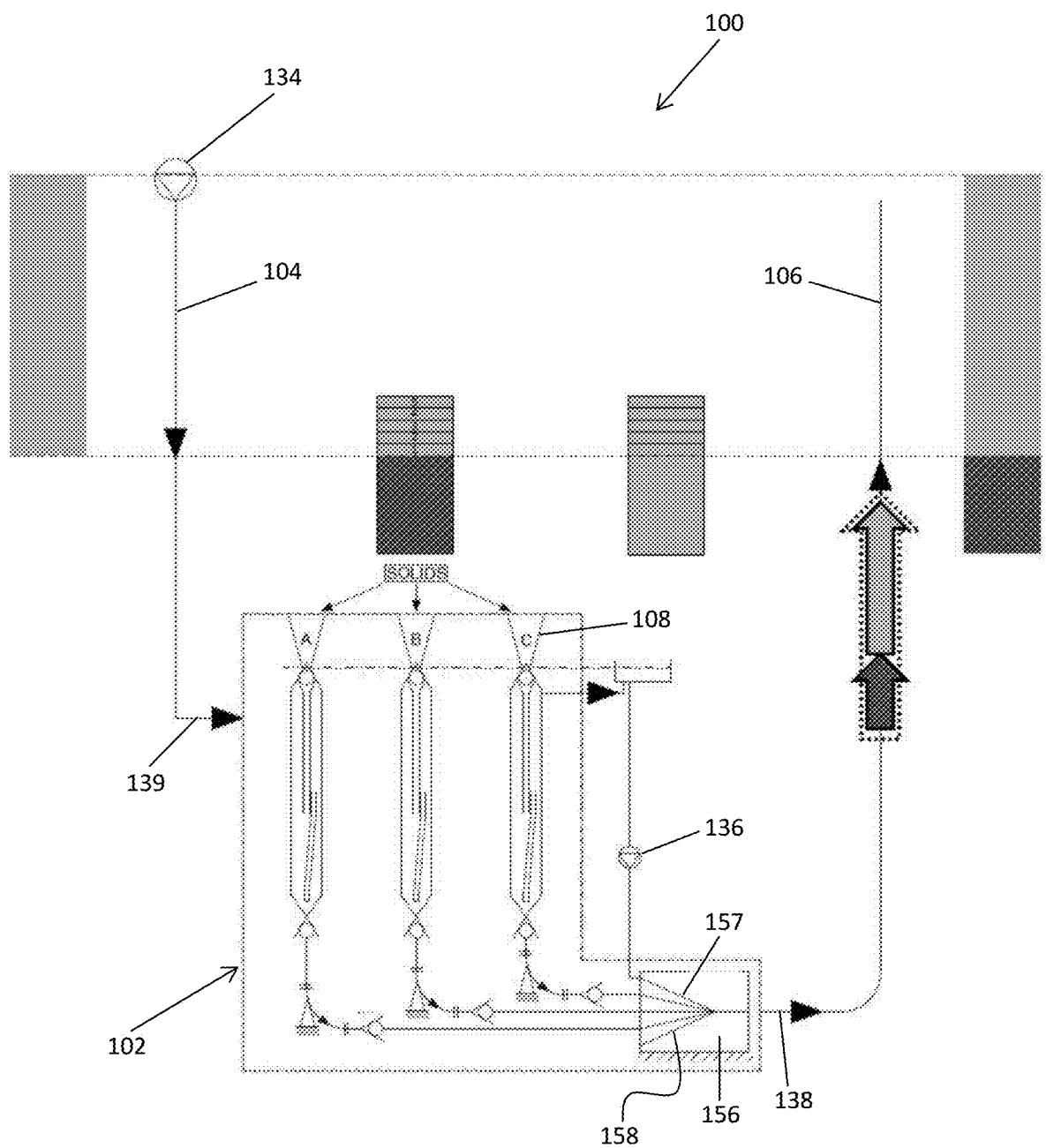
FIG. 1 a schematic illustration of the mass balance and flow continuity of a 3 chamber hydro hoist with a chamber feeder arrangement in accordance with the invention.

Referring to the drawings, apparatus in accordance with the invention provides a drop chamber hydro hoist which will generally be referred to as a 3 chamber hydro hoist or 3CHH (100). The 3CHH (100) is provided to vertically lift solids or ore in a slurry form. The complete hydro hoist provides a slurry transport system (100) and can be separated into two sections for this description: the 3CHH core or feeder arrangement (102); and the adjacent systems (which will be separately numbered where relevant).

The adjacent systems include the incoming, supply (102) and outgoing, delivery (104) vertical pipe columns, solids batching equipment, connecting pipes, valves, tanks, pumps, surface equipment and all the components of the system not in the 3CHH core (102). The drawings do not show the adjacent systems in any detail.

The 3CHH core (102) includes three chambers (A, B, C) that are vertically arranged below respective batching flasks (108). The 3CHH core (102) provides a feeder arrangement for the slurry transport or hoisting system (100), wherein each chamber has a top end (110) and a bottom end (112) and includes:
a. a high pressure water inlet (114) adjacent the top end controlled by a first valve (116);
b. a low pressure solids inlet (118) controlled by a second valve (120);
c. a low pressure water outlet (122) adjacent the top end controlled by a third valve (124) for displaced water when the solids inlet (118) is opened; and
d. a high pressure solids (and water) outlet (126) controlled by a fourth valve (128) located in at a bottom end.

In accordance with the invention, the low pressure solids inlet (118) has a transfer chute (130) that opens into a lower section (132) of the chamber (A, B, C) to maintain a clear-water environment adjacent the top end (110).

Figure 2:
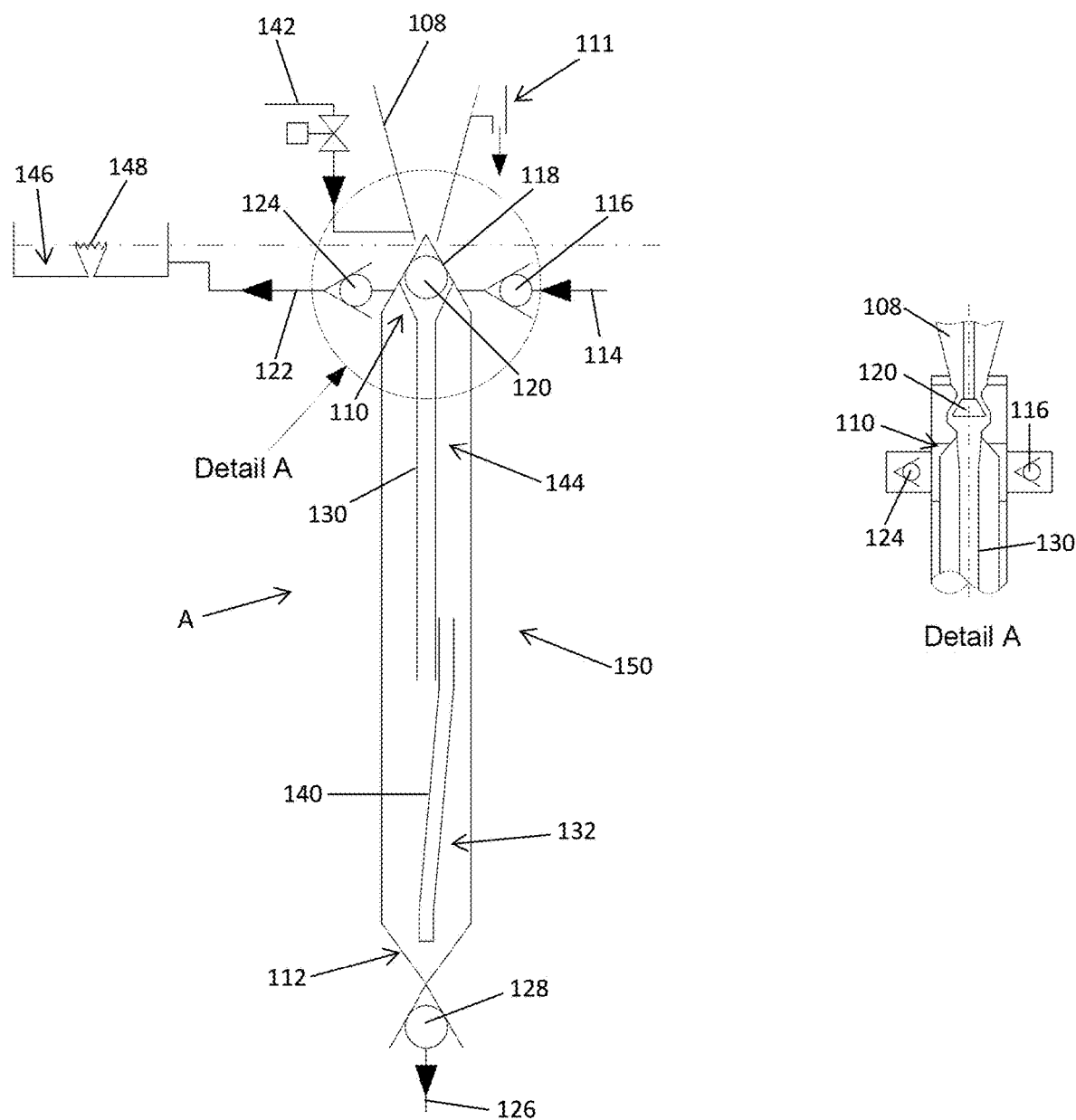
FIG. 2 a side cross-sectional schematic view of a single chamber from a feeder arrangement of the hydro hoist in FIG. 1.
Figure 3:
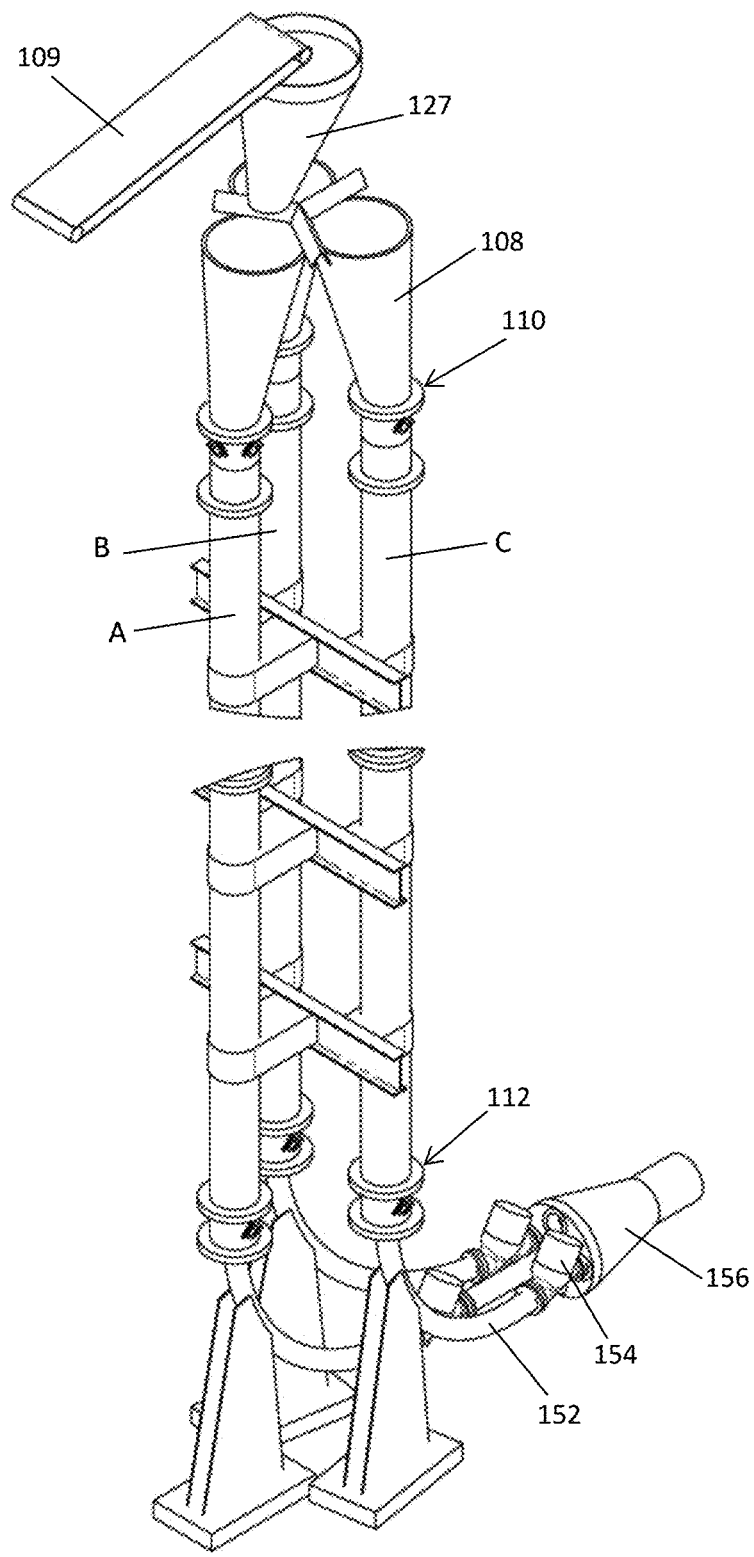
FIG. 3 a perspective view of three chambers from a feeder arrangement of the hydro hoist.

In the embodiment of FIGS. 1 to 3, the three chambers (A, B, C) are supported in a raise-bore hole of suitable diameter (about 3.5 m in this example) provided between two levels in an underground working of a mine. The 3CHH core (102) is located between a first, upper level and a second, lower level. The levels may be about 1600 m below surface with about a 40 m vertical separation between the two levels.

The 3CHH (100) is connected to the clear-water supply column (104) from surface and delivers slurry up the delivery column (106) to the surface. A 250 NB column size is proposed for the columns in this example.

A minimum of two columns (104) and (106) are required for clear-water supply from the surface to the 3CHH core (102) underground and for slurry delivery from underground to surface. The pipeline columns between the clear-water and slurry delivery level and the surface are made substantially identical with the purpose of being interchangeable so that the function can be periodically rotated enabling the wear caused by the vertical upwards flow of slurry to be shared between the columns. The invention further provides for a spare column or columns to be included and for the functions of the columns to be periodically changed, so the wear can be shared between all the columns, thus extending the life of the hydro hoist and reducing risk in the event of a column failure (for whatever reason). The interchangeability will depend on a scheduled shutdown, disconnection from a column that has been drained and reconnection to the extra column.

A surface booster pump (134) pushes the water down the clear-water supply column, through the three chambers (A, B and C) and up the slurry delivery column. The booster pump duty is well suited to a multi-stage, centrifugal-pump with variable-speed drive (VSD) control. In addition, an underground, clear-water injection pump (136) or pumps are used to inject the water displaced by solids (and due to compression, air and other flushing or other water added) back into the slurry transport system. In this example, the displaced water re-injected into a delivery line (138), downstream from the 3CHH core (102).

The 3CHH (100) can be constructed to operate on only two active columns because displaced clear-water is injected back into the slurry delivery column by the injection pumps. The re-injection of displaced water into the slurry transport system serves to achieve dilution and favourable solids/rock densities. The displaced water may also be re-injected back into a clear-water supply conduit (139) upstream of the chamber or into the chamber (A, B, C) directly. In that case, the re-injected water contributes to clearing the chamber as well as dilution of the solids.

The pumps (134) and (136) provide energy to overcome frictional pressure drops and the frictional energy dissipation by the solids hindered settling velocity and to lift the solids against the force of gravity.

The three chambers (A, B, C) are vertically supported and arranged parallel in a triangular configuration. The three chambers are gravity-filled from the batching flasks (108) located above each. The batching flasks may be fed with solids from a belt conveyor (109) on the upper level. The feed (crushed rock) from the conveyor will preferably include addition of clear- or dirty-water which is sprayed into the solids in the flask. In a preferred embodiment, the solids are wet fed into the three flasks, each of which has a weir (111) and overflow collection bin. A rotating eccentric or bent pipe is used to fill the batching flasks (108) with the wet-solids. In this manner, each batching flask is filled to a substantially fixed volume to provide a consistent batch for each chamber. The overflow will be recirculated.

The transfer chute (130) that extends from the solids inlet (118) delivers "falling" solids, from a second, solids inlet valve at the top (110) of the chamber, to the lower section (132) of the chamber and allowing for quick delivery to the bottom (112) of the chamber (A, B, C). A bottom by-pass duct (140) is configured and arranged to deliver water from above the lower section (132) of the chamber to adjacent a bottom of the solids bed in the lower section. The chambers can be suitably inclined instead of vertical. A vertical (or inclined) chamber arrangement uses gravity to assist the flow of solids into and out of the chambers.

The chamber bottom (112) is also tapered or inclined towards the high pressure solids and water outlet (126) to facilitate evacuation of the solids from the chamber (A, B, C). Distribution into the three chambers (A, B, C) is achieved by means of an eccentric rotary distributor or funnel (127) that fills each flask in sequence. The rotary distributor (127) rotates one revolution for one complete cycle (i.e. 3 individual chamber cycles). The position of the distributor is measured with a rotary encoder which ensures suitable synchronization. The rotary distributor gearbox motor is speed controlled to ensure synchronization with the cycle.

A top second, solids inlet valve (120) is used to control the introduction of solids that are "dropped" into the vertical chamber (A, B, C) from the flask in a fraction of the single chamber cycle time (e.g. about 33% to 66% of the total time). This leaves the remainder of the time to flush the flask (108) and second, solids inlet valve (120).

It is preferred to use flushing water sprays that can be introduced in a manner that serves to agitate the rock in the flask (108) to aid the emptying of the flask and to clear all the rock from the flask through the second, solids inlet valve (120). Water sprays (preferably two or more) will also be located adjacent and suitably directed into the second, solids inlet valve (120) to keep it clear of solids. Importantly, this also allows the second, solids inlet valve (120) to be reliably closed in clear-water and to therefore seal effectively with minimal wear. The sprays will be connected to a water supply (142) from a clear water flush tank.

The transfer chute (130) allows the solids to gravitate from the second, solids inlet valve (120) to the bottom (112) of the vertical chamber (A, B, C), forming a slightly stratified bed at the bottom of the chamber. When the solids fall through the water in the lower section there will be some mixing of the water as this is displaced upwards. The transfer chute (130) ends or opens at a height above the bottom of the vertical chamber so that solids are separated from a top zone/volume at an upper section (144) of the chamber.

A volume of clear-water equal to the volume of water and solids added to the chamber will be displaced through the third, low pressure water outlet valve (124). This will be clear-water coming from the upper section or volume (144) of the vertical chamber (A, B, C). The arrangement and position of the third valve (124) ensures that it can be reliably closed in clear-water and seal effectively with minimal wear.

A clear-water constant-head tank (146) collects the displaced clear-water that flows through the open the third, low pressure water outlet valve (124). The level of a notched over-flow weir (148) is positioned just above the top of the second, solids inlet valve (120) to avoid an air pocket in the top of the chamber just below the second, solids inlet valve (120).

The clear-water constant-head tank (146) is in turn connected through a lower (clear-water) tank and return pump and an upper (clear-water) tank to the injection pumps (136). The over-flow from the constant-head weir (148) will gravitate to the lower, clear-water tank, where it is later pumped to the upper-level clear-water tank. This upper tank will be positioned at an elevation such that it can provide a flooded suction for the injection pump (136).

At the end of the solids filling cycle (in this embodiment):
The lower section (132) (about the bottom third) of the chamber will be substantially filled with a pile or bed of coarse solids and dirty water.
A middle zone (150) (about the second third) of the chamber will be occupied by dirty water with the suspended fines.
The upper section (144) (about top third) of the chamber represents a clear-water zone.

When the first, high pressure water inlet valve (116) and the bottom fourth, solids discharge valve (128) are opened, commencing a solids discharge part of the cycle, water from the middle zone flows through the by-pass duct (140) amongst the coarse solids and into the high pressure outlet to dilute the concentration of the coarse solids as they exit the chamber.

The by-pass duct (140) provides a quick route or low resistance path to bottom valve to dilute the coarse solids. The water through the by-pass duct (140) agitates and/or erodes the bottom of the solids bed. The action of this water at this location facilitates the evacuation of the solids from the chamber (A, B, C).

In the currently disclosed embodiment the arrangement and configuration of the chamber, transfer chute (130) and by-pass duct (140) serve to achieve the following approximate result: the middle third of dirty water mixes into the bottom third so that the water from the middle zone (150) and lower section (132) exits the chamber (A, B, C) in about two thirds of the cycle time.

The fourth, high pressure outlet valve (128) should only be exposed to clear-water that passes therethrough for the remaining third of the cycle time after which it is closed. Since the volume of the solids and the spaces between them in the pile, which forms as a stratified bed, is less than half of the volume of the chamber, the clear-water pumped by the booster pump into the top of the chamber (A, B, C) has sufficient time to expel all the solids and refill the chamber with clear-water. This ensures that the bottom solids discharge valve (128) is reliably closed on clear-water and seal effectively without wear. The first, high pressure inlet valve (116) is supplied with clear-water from surface and is located at the top (110) of the chamber (A, B, C). It can therefore be reliably closed in clear-water without wear.

On opening of the bottom fourth, solids discharge/outlet valve (128), the water in the chamber flows and the solids gravitate out of the vertical in a fraction of the single chamber cycle time (typically about 67% of the total time). This leaves the remainder of the time to flush the chamber, transfer chute (130), bottom by-pass duct (140) and fourth, solids discharge valve (128). The fourth, solids discharge valve (128) is closed in clear-water under low pressure differential with minimal wear.

Below the bottom fourth, solids discharge valve (128) a very long-radius outlet bend (152) connects each vertical chamber (A, B, C) to a delivery manifold (156). The long-radius outlet bend (152) is about 10 or more times the delivery pipe inside diameter and serves to reduce wear and the risk of blocking. A secondary slurry non-return valve (152) is provided between each chamber (A, B, C) and the manifold (154), primarily as a safety device to prevent a significant backflow of slurry or water into a chamber should the bottom solids-discharge valve get stuck open, say due an over-size rock or foreign body. These valves (152) may be of any suitable type.

The delivery manifold (156) has five connections at the inlet end and one to the slurry delivery column at the outlet end. The five connections are:
(a) Chamber A outlet bend,
(b) Chamber B outlet bend,
(c) Chamber C outlet bend,
(d) Clear-water injection (157) from the pumps (136)—either the injection pumps in normal operation or to the surface booster pump (134) in flushing mode to the slurry delivery column (106), and
(e) Slurry column drain valve connection (158).

The delivery outlet or line (138) from the manifold (156) will include a spool pipe and outlet bend for connection to the vertical slurry delivery column (106).

The column drain valve should be located close to the delivery manifold (156). It must be able to be actuated in an emergency in the event of a total loss of power and without delay.

The surface centrifugal, clear-water booster pump (134) will employ the VSD control to deliver the correct water supply volume flow rate and pressure close to the best efficiency point. Both flow and pressure will be measured on surface. A pressure sustaining valve maintains back pressure by throttling the flow ensuring that a centrifugal pump does not exceed a desirable output power to avoid possibly damage of the pump when the system is not full or cannot otherwise provide back-pressure for the pump to pump against.

The underground positive-displacement injection pump (136) can be controlled by either step control or VSD motor control. Multiple small plunger pumps can be cost effective with maximum flexibility and stand-by capacity and avoid the need for VSDs.

Before the 3CHH (100) core can be operated in normal slurry delivery mode, numerous interlocked conditions must be met to ensure that it is safe to proceed. The 3CHH (100) uses the principle of a U-tube that allows a hydrostatic head in the supply column to be available at the base of the delivery column and to assist in displacing fluid out of the delivery column as fluid is pumped into the top of the supply column.

In the current embodiment, the three chambers are operated in a rotating sequence so that:
one is being filled with rock at low pressure,
one is delivering fluid and rock at high pressure, and
the third is being either pressurized or de-pressurized in anticipation for the next operation in the sequence.

The cycles are staggered and are designed to produce (substantially) continuous flows rates in the supply and delivery columns.

In the vertical chambers (A, B, C) of the 3CHH (100), the flow is substantially downwards. The only flow going upwards and exiting the chambers at the top is the volume of fluid displaced by the addition of solids and additional water with the solids and after the solids to flush the batching flask (108) and second, solids inlet valve (120).

Clear-water is filled into the top section (of the chamber at the same time as slurry is discharged from the bottom. Solids are loaded by gravity from a "batching" flask through the top solid-filling valve.

The timing of each step is determined by a PLC program that instructs valves to open or close. Pressure transmitters measure pressures in the chambers and supply and delivery manifold and, only if the pressure equalization with a safe margin has occurred, can the next step be performed.

By the fluid mechanics principle of continuity, when run at a constant speed, without leaks, and ignoring fluid compressibility, the volume of fluid in must match the volume of fluid out. In wet slurry filled methods, the water in slurry will add to the "additional displaced volume" to be pumped. Similarly, any water added to create a "clear-water zone" on which valves are closed would be an additional volume to be pumped.

Figure 4:
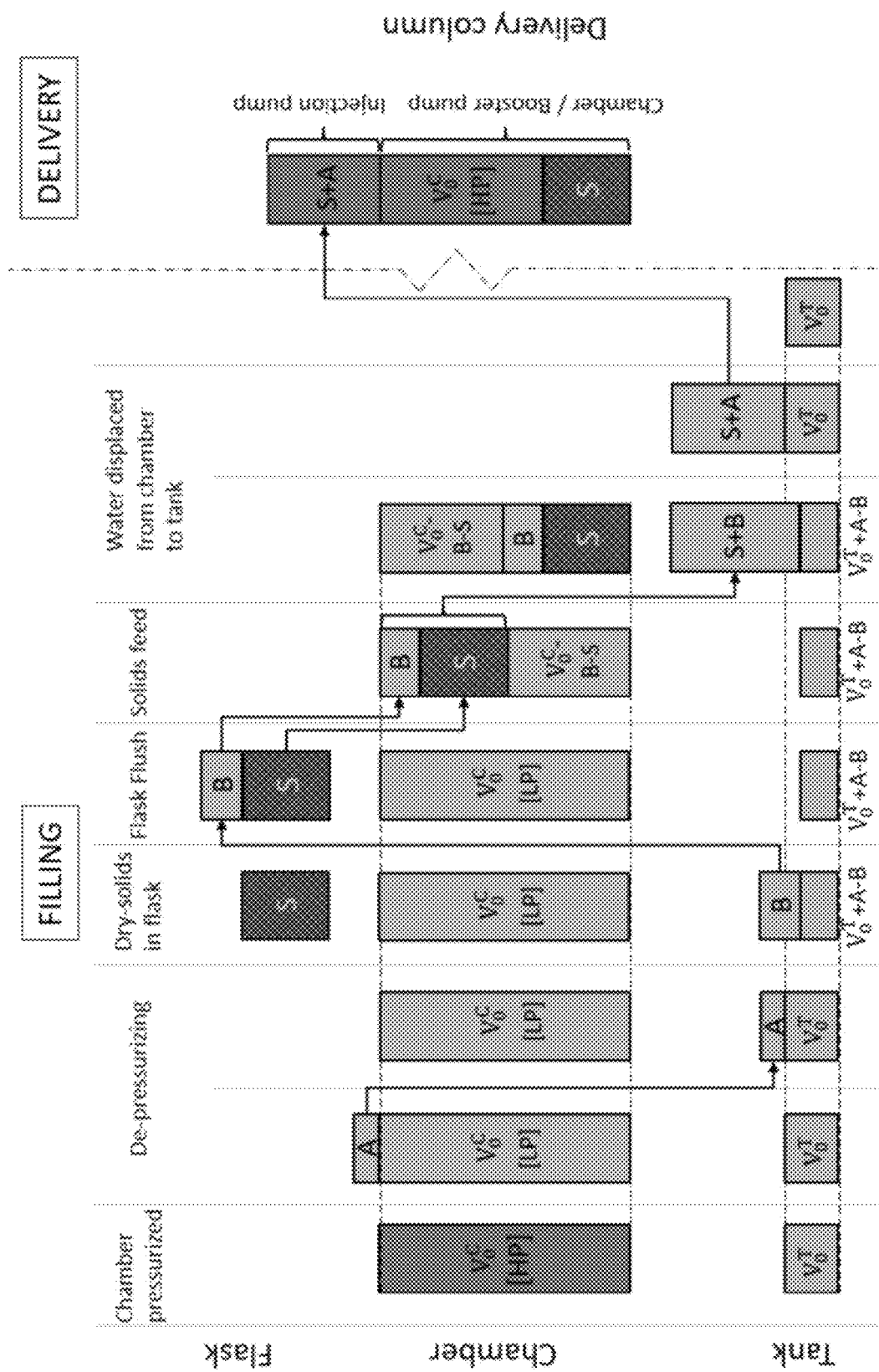
FIG. 4 an illustration of the mass balance and flow continuity of a 3 chamber hydro hoist.

If a flow of solids dry or wet (and some flushing water) is added to the "fluid in" then an equal volume of fluid will be displaced from the system as that occupied by the solids. The illustrations and example/demonstration data in FIG. 1 and FIG. 4 are relevant. Using gravity to feed the solids allows the filling of solids to take only part of the filling cycle time. The rest of the time is available for solids to separate under gravity and move away from the second, solids inlet valve (120) and for additional precautionary flushing of the solids filling flask and second, solids filling valve.

Ducting the solids from the second, solids filling valve via the transfer chute (130) to the bottom or lower section of the chamber and using the gravity head (fall height) in the flask to accelerate this flow, provides for the solids to be delivered to the lower section of the chamber, away from the second, solids inlet valve, in a fraction of the filling cycle time. By concentrating the solids at the bottom of the chamber (i.e. not uniformly mixing them throughout the chamber) via the transfer chute (130), the upper part of the chamber can be kept full of clear-water, thus ensuring that the second, solids inlet or filling valve (120) is always closed in clear-water.

The bottom by-pass duct (140) allows the fluid from the middle zone or the upper section of the chamber to flow directly to the bottom or lower section of the vertical chamber within a pile of solids. The bottom by-pass duct (140) provides a low resistance passage for water from above a pile of settled solids to a position within the pile and adjacent the bottom of the chamber.

The arrangement and flow at an outlet of the by-pass duct (140) serve to fluidise and dilute the solids entering the fourth, solids outlet valve (128). The solids inside the pile are mobilised adjacent the high pressure solids and water outlet. It is, accordingly, the by-pass duct (140) that makes it possible to deliver the solids of the chamber is less than the full pumping cycle time allowing the fourth, solids outlet valve (128) to be well flushed before closing.

The bottom by-pass duct (140) may be provided in various forms. In this example, the by-pass duct (140) is at least one pipe that extends within the chamber. The by-pass duct (140) extends from a first location above an opening of the transfer chute (130) to a second location adjacent the bottom end of the chamber. The by-pass duct (140) depends from (i.e. is secured to) the transfer chute (130), with an inlet to the by-pass duct (140) spaced upwardly from an outlet from the transfer chute (130).

On the "pumping" or solids delivery part of the cycle (high pressure displacement of water from the chamber into the delivery column), the solids are displaced in the initial part of the cycle out of the fourth, bottom solids outlet or delivery valve (128), followed by clear-water from the upper section of the chamber, thus ensuring that the fourth valve (128) closes in clear water.

The lower (clear-water) tank collects the water from the constant head tank on the first level and a return pump lifts and returns this water to the upper clear-water tank.

The upper (clear-water) tank provides storage and surge volume for displaced clear-water. The storage volume allows the injection pumps to be step controlled and provides the necessary net positive suction head required by the injection pumps.

The high pressure injection pumps deliver the displaced clear-water back into the slurry delivery column. These pumps assist in moving the solids out of the delivery manifold, up through the delivery outlet bend and into the delivery column.

If positive-displacement plunger pumps are used for this duty, then as long as the slurry column resistance is not excessive (say due to a blockage), these pumps will deliver fluid into the column at the same pressure as the delivery manifold. Their delivery pressure will match "back-pressure" resistance of the delivery column requiring no other control.

This injection feature eliminates the need for a separate column for displaced water. The water is "brought down once" via the supply column and is "pumped up once" in the slurry delivery column. The "water down" therefore only needs to match the "water up" as employed for displacement of the slurry.

Multiple plunger pumps in parallel can provide variable capacity in steps. Clear-water, plunger pumps are ideally suited to this high pressure, low-volume duty.

The injection pump connection to the delivery manifold will be fitted with non-return valve (NRV) mounted vertically as high as possible (or practical) from the slurry, such that the NRV will be seated so that solids gravitate down, away from the valve. This will be fitted to prevent unintended reverse flow from the slurry side to the clear-water side.

The solids mass flow rate delivered can be infinitely varied by changing the speed of the feed that supplies the batching flasks. The mass concentration (Cw=concentration of solids by weight) can be accurately controlled from 0 to about 50% by varying the pumping volumes to maximize efficiency at any solids mass flow rate.

The average slurry concentration depends on the solids mass flow rate and the water volume flow rate in the delivery column. The volume in the delivery column depends on the supply flow rate, less the displaced volume plus the injected volume. The average injection pump flow rate needs to be controlled in steady state operation.

The level in the lower- and upper-tanks is a proxy for the difference between the volumes displaced and injected and these levels should be managed in a suitable band that ensures water is available for the injection pumps and that there is spare capacity to receive clear-water. The control objective will be to operate the injection pumps and manage water levels so the average water supply flow from surface matches the average volume of water in the slurry to surface, thus maintaining continuity. If water from the water supply column is needed for other purposes underground, then this continuity will have to be suitably adjusted.

A slurry mass flow meter (SFM) and a slurry density meter (SDM) are included downstream from the manifold to measure these parameters. The instantaneous slurry density of the "slug" of over-concentrated slurry delivered from the fourth, solids outlet or bottom slurry-delivery valve (128) on each chamber, after it has been diluted with injected water, can be measured with the SDM as well as the interval of substantially clear-water used to flush this valve between "slugs".

The duration of the "slug" flow (as a fraction of the chamber cycle time) can be varied to some extent by the size of the bottom by-pass duct (140) but should not exceed say 67% of the cycle to ensure good flushing with the last 33%.

The "slugs" of solids should homogenize in the column because "fines" from the top of the "slugs" travel faster than the average "slug" speed, thus rising to meet the largest particles "falling off the bottom" of the "slug above". This has been modelled and even for completely random inlet slurry concentrations, outlet concentrations at the upper end of the delivery column are substantially uniform.

The invention provides for correct start-up from zero flow to through to the operating flow rate. Fitting the booster pump with a VSD ensures smooth start-up and acceleration of the water in the system. Once flowing smoothly with clear-water, solids can be added and the 3CHH brought into "normal slurry delivery" mode.

Pressure equalization (within a small margin) will be achieved before opening of valves to avoid sudden large transient flows and associated pressure surges. This is one of the fundamental requirements for safe and smooth operation of the system. This will be achieved by ensuring that it is mechanically impossible for an actuator to open or close a valve if pressure equalization is not achieved within a small margin.

The invention provides for correct filling and air removal from columns, valves, connecting pipes and chambers and for smooth, continuous cycling of the chambers achieving constant flow rates in both columns and without significant pressure surges.

The 3CHH core is controlled by the PLC in a series of steps. Before advancing to the next step a check is made that all conditions necessary for safety are met. The timing of the total cycle time is synchronized with the rotary distributor via the encoder and VSD on the motor.

A column flush valve (CFV) is provided in a branch that connects the supply column to a line downstream from the injection pumps and allows the slurry delivery column to be flushed clean of all solids if the 3CHH core is paused or is otherwise non-operational. When actuated, the CFV by-passes the 3CHH core and directs the booster pump supply water to flush the slurry delivery column.

Flushing the solids out of the slurry column with clear-water supplied from the surface booster pump is the preferred way to shut-down the 3CHH and facilitate an easy re-start when required. The invention provides for correct flushing of the slurry delivery column of all solids before slowing the flow rates to zero. This is the reverse of the start-up procedure where the delivery column is flushed with clear-water by opening a CFV and pausing the chamber cycling.

If flushing using the booster pump is not available, the next course of action would be to flush using the greatest number of injection pumps available. This may not fully flush the heaviest particles from the column as column velocities may be too low, but it will slow settling and reduce the risk of blocking.

The CFV must also be able to open at the correct speed (not too fast or too slow) in the event of a loss of power underground. The approach ensures the chambers are always by-passed with flushing water until the delivery column is flushed of solids and thereafter the surface booster pumps can be stopped in a controlled manner.

Correct draining of the delivery or supply columns is also provided for when required. The slurry delivery column must be drained, either as part of a normal maintenance procedure, or in emergency in the event of a loss of both surface and underground pumping flows. If flushing is not available by either of the pumps, say due a general power failure, then the next course of action is to drain the column in a controlled manner via the Column Drain Valve (CDV), dissipate the pressure energy in a dissipater and deposits the solids in place where they can be loaded back on to a conveyor once drained and divert the dirty-water in the dirty-water collection sump. In the emergency case, the CDV must open rapidly (less than about 1 second), without electrical power or controls, if pressure surges are to be avoided. Surge anticipation valves (SAV) would be used.

Suitable design requirements for both the CDV and the dissipater will be provided. The CDV must be leak-tight in the presence of solids and the dissipater must drain the column at more-or-less constant (controlled) rate despite the contents varying from over-concentrated solids slurry due to settling or "slugs" through to almost clear-water to avoid excessive velocities and the associated wear.

Figure 5:
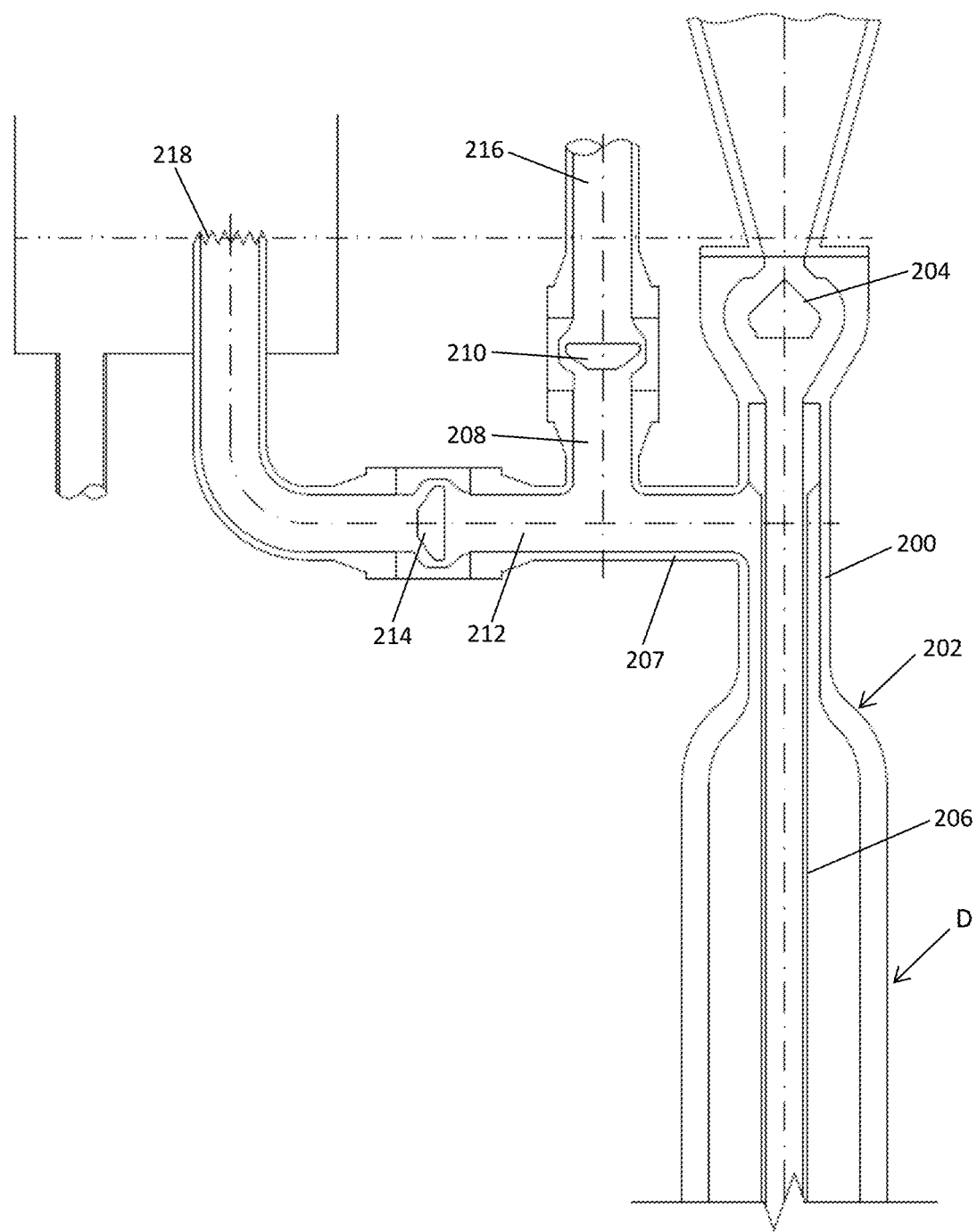
FIG. 5 a side view of an alternative arrangement of parts at an upper end of a chamber.

Referring to FIG. 5, a chamber (D) is shown that departs from the configuration indicated in the schematic drawing of FIG. 2, where the high pressure inlet and low pressure outlet are indicated on opposite sides. In this more specific embodiment, a primary connection (200) is provided into the top end (202) of the chamber (D).

The primary connection is provided by a vertical pipe (200) that with a second, low pressure solids inlet valve (204) located at a top of the vertical pipe (200). The second valve (204) is isolated from the interior of the vertical pipe (200) with a transfer chute (206) that extends concentrically along the inside of the vertical pipe (200) and into the chamber (D), as required.

A secondary connection (207) is provided by a lateral pipe (207) that extends into a side of the vertical pipe (200). A high pressure water inlet (208) with a first valve (210) and a low pressure water outlet (212) with third valve (214) are connected to the secondary connection (207) for communication with the chamber (D) through the primary connection (200), around the transfer chute (206).

The high pressure inlet (208) will be connected to a supply conduit (216) and the low pressure outlet (212) has a constant level arrangement (218) that serves to keep the second valve (204) submerged. The remainder of the chamber (D) may be as described above but of variable height depending on the application.

It will be appreciated from the embodiment of FIG. 5 that the valves at top of the chamber, and particularly the first, high pressure water inlet valve (210) and the third, low pressure solids outlet valve (214) may have a clear-water volume provided in the respective inlet and outlet pipes, which in this case chare the secondary connection (207), to and from the chamber (D).

The 3CHH brings together several technologies that must operate in concert under the direction of a control system. These technologies include:
 (a) Solids materials handling;
 (b) Pumps (both centrifugal and positive-displacement);
 (c) High pressure water valves;
 (d) Piping systems under both steady-state and severe cyclic pressure conditions;
 (e) Surface wear management; and
 (f) Vertical hydro transport of coarse settling-solids.

The physics of vertical hydro transport of coarse settling-solids for any solids mass flow rate determines the velocities in the delivery column and hence the supply water volume flow rate. The hydro transport operating parameters are therefore to be controlled within a safe, low-wear and/or energy-efficient operating envelope.

The invention incorporates a control system provided to achieve the following operations as described in this specification:
 (a) Correct solids mass flow rate;
 (b) Correct water supply volume flow rate;
 (c) Correct slurry concentration;
 (d) Correct operation of all the valves in both normal operation and abnormal conditions;
 (e) Correct filling and air removal of columns, valves, connecting pipes and chambers;
 (f) Correct start-up from zero flow to through to the operating flow rate;
 (g) Pressure equalization (within a small margin) before opening of valves to avoid sudden large transient flows and associated pressure surges;
 (h) Smooth, continuous cycling of the chambers achieving constant flow rates in both columns and without significant pressure surges;
 (i) Correct flushing of the slurry delivery column of all solids before slowing the flow rates to zero;
 (j) Correct draining of the delivery or supply columns when required; and
 (k) Correct emergency shut-down mode in the event of any abnormal condition occurring.

The system is suited to run smoothly and continuously. The system also accommodates a varied choice of the cycle time and chamber volume. This in turn affects the number of valve cycles or operations in a period. The system valves operate in clear-water and seal effectively with minimal wear, damage or leaking for hundreds of thousands of cycles.

The column wear is strongly determined by the velocity of the slurry but can be reduced by including an appropriate lining (HDPE, polyurethane, rubber, ceramic materials or high-chromium steels, for example). To extend wear life, velocities need to be as low as possible and the slurry column operating hours minimized. The system can operate at lower speeds when this is all that is needed. Larger chambers with long cycles and fewer operations per year have a benefit if the system can be made to run faster when needed. The system improves reliability and reduces risk through the following elements:
 (a) Reasonable chamber volumes and cycle times, not too slow or too fast.
 (b) Ability to run at lesser and slower solids delivery rates than the nominal rating.
 (c) A robust design with multiple systems to prevent damage that could cause long delays due to excess pressure or flow, over-size particles, fires, etc.

The operating efficiency (defined as power to lift solids/power into pump motors) is estimated to be in excess of 50%.

In one example, the invention is estimated to make possible the hydro hoisting of about 1.4 Million tonnes per annum (Mtpa) of rock with a specific gravity (SG) of about 2.8, crushed to 20 mm or less, from a depth of around 1600 m to surface. The 3CHH is not expected to perform more than 250 000 cycles per year to deliver the estimated 1.4 Mtpa. The 3CHH system serves to ensure that all chamber valves are reliably closed in clear-water and therefore can seal effectively with low-maintenance requirements. This avoids the technical challenge of ensuring "a leak-tight" closure between the valve poppet (or closure) and seat in the presence of solids and high pressure differentials. The problem is eliminated.

The apparatus of the invention provides superior reliability due to valves closing in clear-water, relatively few components, relatively low volumes to be pumped and intrinsic high efficiency. Ultimately, extra valve or pump motions or energy not used to lift solids, contributes to wear. The invention avoids this.

With regard to chamber wear life, almost no wear is expected in the vertical 3CHH. The top 60% of the chambers are not exposed to solids at all, and slurry velocities in the lower section of chamber will be <1 m/s, which should not generate significant wear. The transfer chute and bottom by-pass duct will probably see velocities of about 3 m/s and are replaceable without dismantling the chambers.

Features, advantages and benefits of the invention include:
(a) Using gravity to feed the solids allows the filling of solids to take only part of the filling cycle time, the rest of the time being available for solids to separate under gravity and move away from the solids inlet or filling valve and/or for additional precautionary flushing of the solids filling flask and valve.
(b) By directing the solids from the solids filling valve to the lower section of the chamber directly via the transfer chute and using the gravity head (fall height) in the flask to accelerate this flow, solids can be delivered to the lower section of the chamber, away from the solids filling valve, in a fraction of the filling cycle time.
(c) By concentrating the solids at the bottom of the chamber (i.e. not uniformly mixing them throughout the chamber) via the transfer chute, the upper part of the chamber can be kept full of clear-water, thus ensuring that the solids filling valve is always closed in clear-water.

(d) On the "slurry delivery" part of the cycle (high pressure displacement of water from the chamber into the delivery column by the pressure-boosted clear-water supply), the solids are displaced in the initial part of the cycle out of the bottom solids-delivery valve, followed by clear-water from the upper section of the chamber, thus ensuring that the solids-discharge valve closes in clear-water.

(e) The bottom by-pass duct, connecting the upper section of the chamber (which is filled with substantially clear-water) to the lower section of the chamber, filled with solids, allows the solids to be fluidised and diluted. This bottom by-pass duct makes it possible to deliver the solids in the chamber in less than the full slurry delivery cycle time, allowing the solids-discharge valve to be well-flushed before closing.

(f) Easy and accurate control of the solids concentration.

(g) Simple solids feed system versus a slurry preparation arrangement that cannot easily deliver consistent solids concentrations.

(h) Valves closing in clear-water will reduce wear/maintenance costs.

(i) High system energy efficiency.

(j) Delivery column wear shared between vertical columns if their usage is rotated.

(k) 3CHH valves will close on clear-water without the addition of large volumes of extra water to separate slurry and clear-water.

(l) The pocket-belt elevator will reduce the 3CHH slurry lift head by 2.2% and will itself be mechanically efficient lifting rock.

(m) Low wear valves, very long-radius outlet bends, chambers and feed system.

(n) Column wear can be shared between the three columns if they are made identical and suitable connected.

(o) Accurate and easy to adjust solids mass flow rate, water volume flow rate and resulting concentrations.

(p) The 3CHH can be provided with a compact footprint arranged between two levels and is ideally suited to such a vertical arrangement.

(q) The vertical excavations for the pocket-belt elevator and the chambers will also provide access for cable and services.

(r) Easy to anchor against weight and transient flow surge pressure forces. Vertical weight of chamber easy to support on footwall foundation with ducks-foot or similar design.

(s) Vertical arrangement assists priming of columns, valves and air removal. Vertical 3CHH design integrates well with proven valve-based technologies for the reduction of excess pressures and flows.

(t) Solids and fluids dumped during dissipater operation can be easily reloaded back into the system.

The invention disclosed accordingly provides for a dry-solids or wet-solids fed, gravity-filled, bottom-discharge, vertically-arranged, 3 Chamber Hydro Hoist (3CHH), as an alternate solution to that which is offered by the prior art. The effectiveness and efficiency achievable through the apparatus of the invention will enable improved hoisting.

The transfer chute in the illustrated example of the invention extends inside the chamber from the top end but could alternatively enter from a side of the chamber and be arranged at a suitable incline or with a suitable downward curve. The invention also allows for wet-solids to be fed into the 3CHH via a transfer chute under a suitable (low) pressure that is achieved from a pump rather than relying on the preferred gravity feed arrangement. This will avoid the need for a constant level arrangement associated with the low pressure solids outlet.

Both the low- and high pressure control valves will preferably be actuated non-return valves with an internal pressure equalization function, but other types are possible.

The invention accordingly involves a solids fed, gravity-filled, bottom-discharge, vertically arranged, 3 Chamber Hydro Hoist (3CHH) which achieves valve closure in clear-water by passing solids into and out of the chambers in a fraction of the "solids filling cycle" and "slurry delivery cycle" periods followed by flushing with clear-water before closing.

Instead of the three chambers disclosed, the arrangement may involve the use of one, two, or even four chambers that employ a source of high pressure fluid to displace a slurry, depending on a particular application or given circumstances.

The by-pass duct is shown extending (approximately) from the middle zone to the lower section. A by-pass duct could also be connected from the upper section to the lower section. Testing has indicated that the simplicity of a low profile, centrally arranged transfer chute and by-pass duct as currently disclosed may be a preferred embodiment. The invention however also allows for the inclusion of suitable flow-resistance devices to be provided above a lower section of the chamber to maintain a (substantially) clear-water environment at a top zone or upper section of the chamber. The flow-resistance devices serve to provide a uniform velocity profile with a flat interface (or front) as the fines rise or drift up with the displaced water from the lower section. The purpose is to prevent any irregular migration of the fines into the top section of the chamber (where they could otherwise be carried ahead by an irregular flow pattern caused by the falling solids).

These flow-resistance devices could be provided at two spaced apart levels in the chamber, for example. The portion of the chamber below the flow-resistance devices would be the lower section and the portion of the chamber between the flow-resistance devices would be the middle zone. The transfer chute would extend past the flow-resistance devices to the lower section. The flow-resistance devices would serve to deter rising of mixed fines to maintain an upper layer or section of clear-water, free of any solids or fines. The flow-resistance devices may be provided as orifice plates. A suitable stack of tubes or some other alternative that equalizes and evens out the flow could also be used.

Various configurations of flow-resistance devices, transfer chutes and by-pass ducts may be employed depending on the application and design parameters.

It will be appreciated that the equipment of the invention may be employed in other slurry transport applications that are not limited to vertical hoisting in the mining industry. The invention may accordingly be used in relation to other particulate material. In this specification, the particulate material is generally referred to as "rock" or "solids" for convenience sake and given the context of the embodiment. This should not be interpreted as a limitation.

The term "slug" as used to refer to a batch of rock or solids introduced into the pipelines as slurry and will be understood by those skilled in the art.

The terms "high pressure" and "low pressure" as used in relation to the inlets and outlets from the chamber will be understood by a person skilled in the art.

A person skilled in the art will further understand that a number of variations may be made to the features of the embodiment described without departing from the scope of the invention.

The invention claimed is:

1. A feeder arrangement for a slurry transport system comprising at least one chamber with a top end and a bottom end, the chamber including:
   a. a high pressure water inlet adjacent the top end controlled by a first valve;
   b. a low pressure solids inlet controlled by a second valve;
   c. a low pressure water outlet adjacent the top end controlled by a third valve for displaced water when the solids inlet is opened; and
   d. the bottom end of the chamber having a high pressure solids and water outlet controlled by a fourth valve and connected to a slurry delivery conduit;
   wherein the low pressure solids inlet has a transfer chute that opens at a position suitably spaced apart from the top end of the chamber to maintain a substantially clear-water environment at or adjacent the top end of the chamber.

2. The feeder arrangement as claimed in claim 1, wherein the transfer chute opens into a lower section of the chamber.

3. The feeder arrangement as claimed in claim 2, wherein the solids inlet is provided adjacent the top end of the chamber and enters through the top end of the chamber with the transfer chute extending from the top end within the chamber.

4. The feeder arrangement as claimed in claim 3, wherein a space between the transfer chute and a chamber bottom is sufficient for a batch of solids to pile with a clearance remaining below the transfer chute.

5. The feeder arrangement as claimed in claim 3, wherein the solids inlet is gravity fed with the second valve located in an outlet from a solids batching flask.

6. The feeder arrangement as claimed in claim 2, wherein a water by-pass duct extends from a first location above an opening of the transfer chute to a second location adjacent the bottom end of the chamber.

7. The feeder arrangement as claimed in claim 6, wherein the by-pass duct is at least one pipe that extends within the chamber.

8. The feeder arrangement as claimed in claim 7, wherein the by-pass duct depends from the transfer chute, with an inlet to the by-pass duct spaced upwardly from an outlet from the transfer chute.

9. The feeder arrangement as claimed in claim 1, wherein the low pressure water outlet is connected to a constant-head arrangement with a water level that keeps the second valve submerged.

10. The feeder arrangement as claimed in claim 1, wherein
   a primary connection is provided into the top end of the chamber, above which the second valve is located and through which the transfer chute extends into the chamber; and
   a secondary connection is provided that extends into a side of the primary connection;
   with the high pressure water inlet and the low pressure water outlet connected to the secondary connection for communication with the chamber through the primary connection, around the transfer chute.

11. The feeder arrangement as claimed in claim 1, wherein the low pressure water outlet is connected to feed at least one injection pump located in a high pressure return line that re-introduces the water to the slurry transport system.

12. The feeder arrangement as claimed in claim 1, including two or more chambers that are vertically supported and arranged parallel in an adjacent configuration, each with a high pressure solids and water outlet feeding separately into a manifold that is connected to the delivery conduit.

13. The feeder arrangement as claimed in claim 12, wherein a rotary distributor rotates to fill a solids batching flask located above each chamber.

14. The feeder arrangement as claimed in claim 12, wherein the slurry transport system is a hydro hoist with a clear-water supply conduit provided by an incoming column connected to a booster pump and the slurry delivery conduit provided by an outgoing column.

15. A method of feeding solids into a slurry transport system comprising:
   introducing solids into a water-filled chamber at a position suitably spaced apart from a top of the chamber;
   maintaining a clear-water region adjacent the top of the chamber;
   while allowing water displaced by the solids to move out of the chamber through a low pressure outlet adjacent the top of the chamber; and
   opening a high pressure inlet adjacent the top of the chamber and a high pressure outlet from a bottom of the chamber to evacuate the solids from the chamber;
   directing the solids into a slurry delivery conduit; and
   closing the high pressure outlet at a stage when there is clear-water exiting the chamber.

16. The method as claimed in claim 15, wherein the solids are fed into the chamber under force of gravity.

17. The method as claimed in claim 16, wherein a batch of solids is introduced into the chamber in a first part of a low pressure chamber filling cycle time and for a remainder of the chamber filling cycle time to be used for:
   the solids and accompanying fines in the batch to settle and migrate downwardly under gravity; and/or
   flushing of a solids batching flask and a solids inlet valve.

18. The method as claimed in claim 15, wherein the solids are delivered into a lower section of the chamber through a transfer chute.

19. The method as claimed in claim 15, wherein a bottom by-pass duct is used to provide a low resistance passage for water from above a pile of settled solids to a position within the pile and adjacent the bottom of the chamber.

20. The method as claimed in claim 15, wherein the low pressure water outlet is connected to a constant-head arrangement with a level provided to keep a solids inlet valve in a low pressure solids inlet submerged.

* * * * *